Oct. 20, 1964  M. E. STROHECKER ETAL  3,153,369
MILLING APPARATUS

Filed Jan. 9, 1962  3 Sheets-Sheet 1

INVENTORS
MANFRED E. STROHECKER
HERMAN C. VOELLM JR.
BY
*Arthur H. Seidel*

ATTORNEY

Oct. 20, 1964   M. E. STROHECKER ETAL   3,153,369
MILLING APPARATUS
Filed Jan. 9, 1962   3 Sheets-Sheet 2
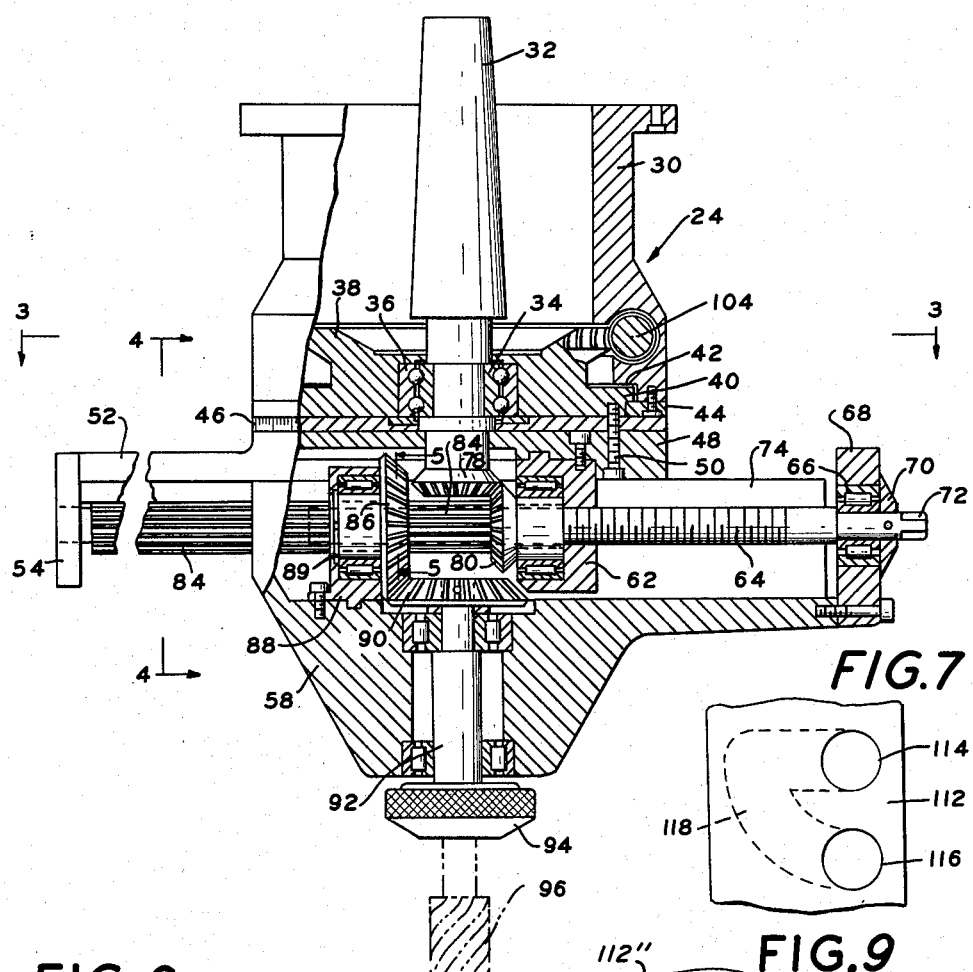
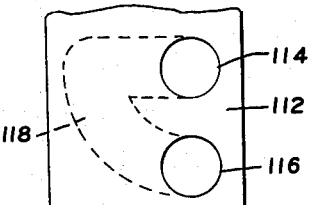
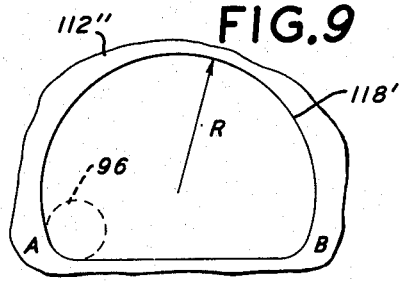
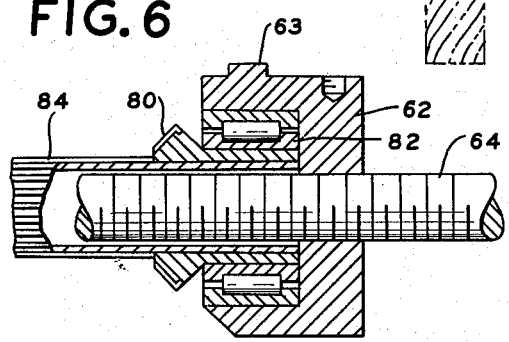
INVENTORS
MANFRED E. STROHECKER
HERMAN C. VOELLM JR.
BY
Arthur H. Seidel
ATTORNEY Oct. 20, 1964   M. E. STROHECKER ETAL   3,153,369
MILLING APPARATUS Filed Jan. 9, 1962   3 Sheets-Sheet 3

INVENTORS
MANFRED E. STROHECKER
HERMAN C. VOELLM JR.
BY
*Arthur H. Seidel*
ATTORNEY

3,153,369
MILLING APPARATUS
Manfred E. Strohecker and Herman C. Voelhm, Jr., Philadelphia, Pa., assignors to Volstro Manufacturing Company, Inc., Philadelphia, Pa., a corporation of Pennsylvania
Filed Jan. 9, 1962, Ser. No. 165,110
7 Claims. (Cl. 90—15)

This invention relates to milling apparatus. More particularly, the present invention relates to a milling head attachment particularly adapted to be used in conjunction with any one of a variety of milling machines for performing intricate milling operations.

The milling head attachment of the present invention is designed to enable a standard milling machine to accomplish intricate milling operations due to the provision for reciprocating and rotating the milling cutter. The milling cutter is mounted so that it may be moved radially and circumferentially with respect to its longitudinal axis. The milling cutter is mounted so that it may be moved radially with respect to the longitudinal axis of the attachment and then rotate through an arc of 360°.

Rotary milling head attachments of the general type of the present invention have been proposed heretofore. For example, see Patent 2,835,172 or Patent 2,960,013. The present invention accomplishes this intended result in a manner which is more efficient and simpler than the devices disclosed in these patents. That is, the above mentioned patents disclose devices which require a secondary source of power for the milling attachment or utilize involved complicated gearing arrangements and bearing surfaces which are easily movable out of adjustment. The milling attachment of the present invention is adapted to utilize the existing motor drive mechanism of milling machines. This feature substantially reduces the cost of the present invention as well as simplifying the assembling and disassembling of the attachment on the milling machine. Likewise, the attachment of the present invention is more readily adapted for movement toward and away from the workpiece.

It is an object of the present invention to provide a novel milling head attachment adapted to be utilized in a milling machine.

It is another object of the present invention to provide a novel milling head attachment which provides radial and circumferential milling.

It is another object of the present invention to provide a novel milling head attachment adapted to be secured to any one of a wide variety of milling machines to enable the same to perform intricate milling operations.

Other objects will appear hereinafter.

For the purpose of illustrating the invention there is shown in the drawings a form which is presently preferred; it being understood, however, that this invention is not limited to the precise arrangements and instrumentalities shown.

FIGURE 2 is an elevation view of the milling attachment of the present invention with a substantial portion thereof shown in section.

FIGURE 6 is an enlarged sectional view illustrating details of the mounting of a beveled gear.

FIGURE 7 is a plan view of a workpiece illustrating the manner in which it may be machined in accordance with the present invention.

FIGURE 9 is a dagrammatic view illustrating another cut which may be made with the present invention.

Figure 1:
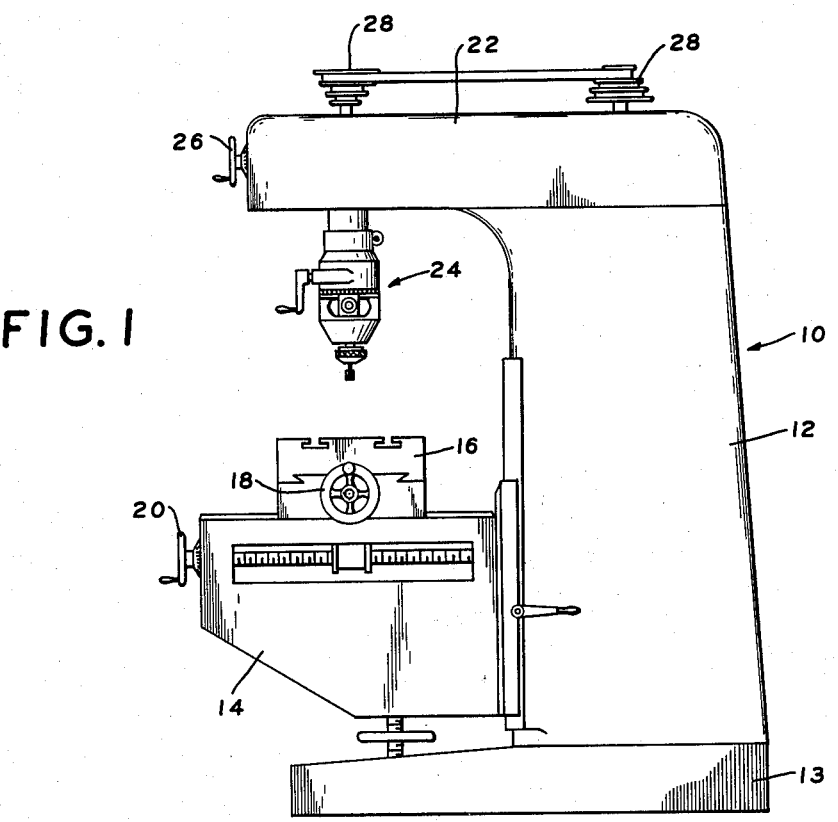
FIGURE 1 is an elevation view of a milling machine incorporating the present invention.

Referring to the drawing in detail, wherein like numerals indicate like elements, there is shown in FIGURE 1 a milling apparatus designated generally as 10. The milling apparatus 10 includes an upright column 12 mounted on a base 13. An adjustable knee 14 is provided on the base 13. The knee 14 has a work support 16 adjustably mounted thereon for movement in two mutually perpendicular directions. Movement of the work support 16 may be accomplished by rotating the handles 18 and/or 20.

The column 12 supports an overarm support 22. The milling head attachment of the present invention is designated generally as 24. As illustrated more clearly in FIGURE 1, the attachment 24 is removably supported in depending relation from the overarm support 22. Movement of the attachment 24 toward and away from the work support 16 may be accomplished by means of handle 26. Any one of a wide variety of devices may be utilized to effect movement of the attachment 24 toward and away from the workpiece 16. A motor, not shown, is disposed within the column 12 and connected to a drive shaft disposed in an upright position within the overarm support 22 by means of pulleys 28. The pulleys 28 are interconnected by means of a belt in a conventional manner.

As shown more clearly in FIGURE 2, the attachment 24 includes a hollow casing 30 which is adapted to be removably secured to the overarm support 22. An upright drive spindle 32 is disposed within the casing 30 and extends out of the upper end of the casing 30 for selective engagement with the drive shaft. The lower end of the drive spindle 32 is provided with a reduced diameter portion which is forced fitted within the inner race 34 of a dual race bearing. The outer race 36 of the dual race bearing is force fitted within a ring gear.

The ring gear is provided with a radially outwardly directed annnular flange 40. The flange 40 is fixedly secured in abutting contact with a shoulder 42 on the casing 30 by means of a ring 44. The inner diameter of the ring 44 is less than the outer diameter of the flange 40. The ring 44 is removably secured to the lower edge of the casing 30 by means of a plurality of threaded fasteners disposed at spaced points around the periphery of the ring 44.

Figure 3:
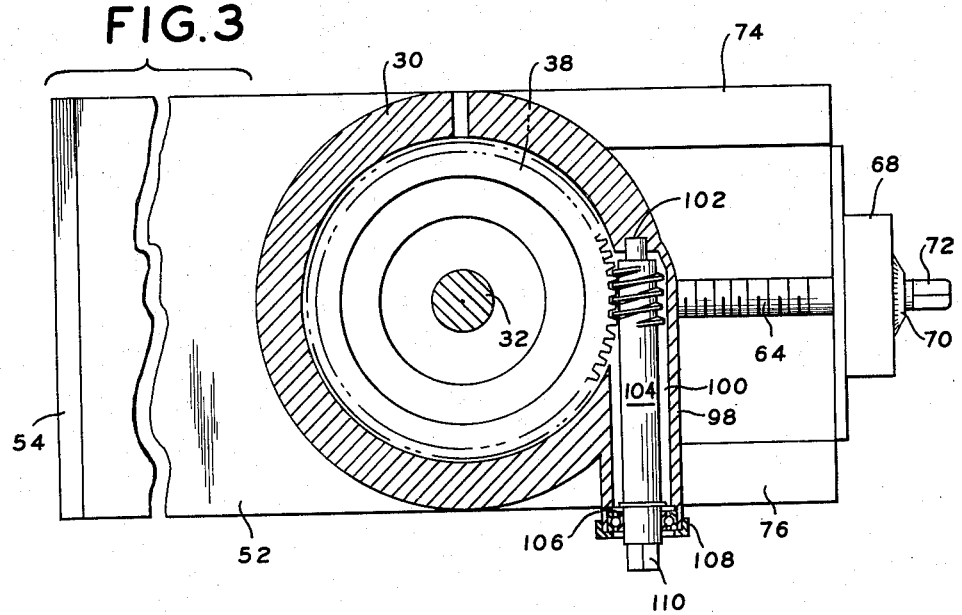
FIGURE 3 is a sectional view taken along the lines 3—3 in FIGURE 2.

A calibrated ring 46 is juxtaposed to the lower surface of the ring gear 38. An annular support member 48 is juxtaposed to the lower surface of the calibrated ring 46. A plurality of threaded fasteners 50 disposed at spaced points around the periphery of the member 48 removably secure the member 48 and ring 46 to the ring gear 38. The member 48 is provided with an integral arm 52 extending in a radial direction to the left in FIGURES 2 and 3. The arm 52 terminates in a downwardly extending flange 54. As shown more clearly in FIGURE 4, the arm 52 is provided with tapered guide surfaces 56.

Figure 4:
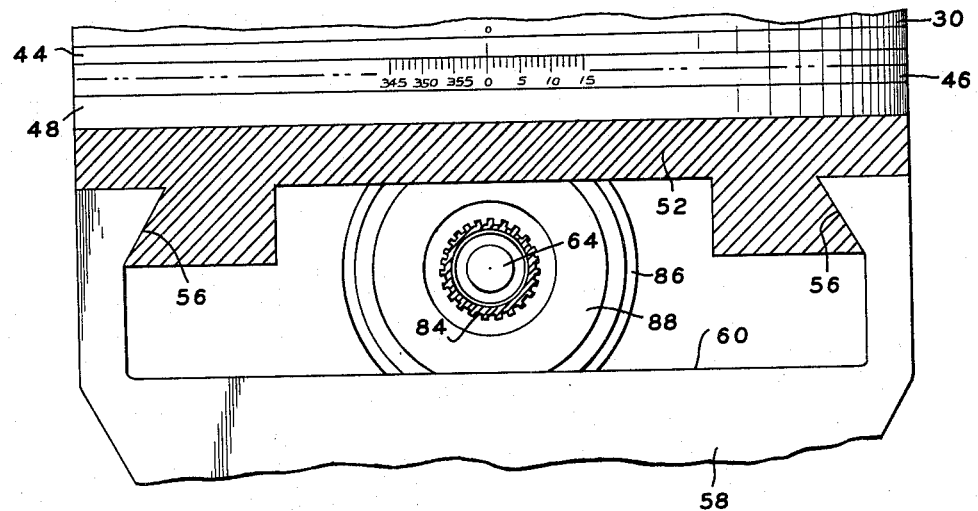
FIGURE 4 is a sectional view taken along the lines 4—4 in FIGURE 2.

A cross slide head 58 is slidably disposed on the tapered guide surfaces 56. As illustrated in FIGURES 4, the head 58 is provided with an aperture 60 for a purpose to be made clear hereinafter. A mounting block 62 is removably secured to the support member 48 by means of threaded fasteners as shown more clearly in FIGURE 2. The mounting block is provided with a rib 63 adapted to be received within a groove on the member 48 to assist in absorbing thrust as will be made clear hereinafter.

The block 62 is provided with a threaded coaxial hole. A threaded rod 64 is threadingly engaged in the hole in the block 62. A reduced diameter end portion of the rod 64 is rotatably mounted within a double race bearing 66. The bearing 66 is mounted within an upright support plate 68. As shown more clearly in FIGURE 2, the plate 68 is removably secured to an extension of the cross slide head 58.

A calibrated dial 70 is removably secured to the rod 64 adjacent the plate 68 for cooperation with a zero marking thereon. The rod 64 terminates in a wrench portion 72.

The extension of the cross slide head 58 is U-shaped in transverse cross section. Thus, the extension comprises a base integral with the head 58 and upright side walls 74 and 76 as shown more clearly by a comparison of FIGURES 2 and 3.

Referring to FIGURE 2, there is disclosed a beveled gear 78 which is removably secured to the lower end of the drive spindle 32. The beveled gear 78 is meshingly engaged with a beveled gear 80. It will be noted that the gears 78 and 80 are in mutually perpendicular planes. As shown more clearly in FIGURE 6, the gear 80 is provided with a tubular shaft force fitted within a dual race bearing 82. The bearing 82 is force fitted within the mounting block 62. A splined tube 84 has one end force fitted within the gear 80. The splines on the splined tube have one end in abutting engagement with a front face of the beveled gear 80. The other end of the splined tube 84 is rotatably supported in a bearing mounted on the flange 54.

Figure 5:
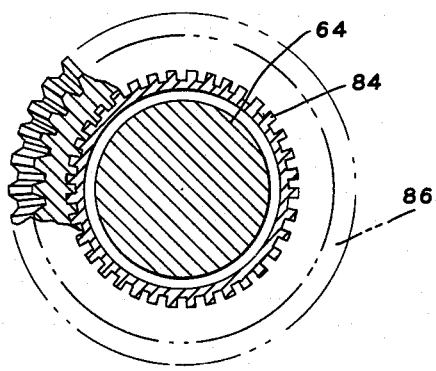
FIGURE 5 is a sectional view taken along the lines 5—5 in FIGURE 2.

The splined tube 84 is meshingly engaged with internal splines on a beveled gear 86 as shown more clearly in FIGURES 4 and 5. The beveled gear 86 has a tubular shaft force fitted within a bearing which in turn is force fitted within a mounting block 88. The mounting block 88 is removably secured to the cross slide head 58 by means of threaded fasteners. A rib on the block 88 is disposed within a groove in the head 58. The tubular shaft for the gear 86 is in abutting contact with a retaining ring 89 which is mounted in the block 88.

The beveled gear 86 is meshingly engaged with a beveled gear 90. The beveled gear 90 is secured to a collet shaft 92 which is illustrated in FIGURE 2 in its zero position. In its zero position, the shaft 92 is coaxially disposed with respect to the drive spindle 32. The shaft 92 is supported by roller bearing adjacent each end thereof. The lowermost end of the shaft 92 is secured to a collet 94 which removably receives milling cutters such as milling cutter 96. It will be appreciated that any one of a wide variety of milling cutters may be utilized with the milling attachment of the present invention.

The hollow casing 30 is provided with a hollow tangential boss 98 which is in communication therewith. As shown more clearly in FIGURE 3, the boss 98 terminates in an end wall which is a portion of the thickness of the casing 30. Such end wall is provided with a blind hole 102. A worm screw 104 is disposed within the boss 98. One end of the worm screw 104 is rotatably supported in the hole 102. The other end of the worm screw 104 is rotatably supported by bearing 106.

The bearing 106 cooperates a snap ring to retain the worm screw 104 in operative disposition so that the threads thereon are in meshing engagement with the threads on the ring gear 38. A threaded cap 108 is disposed on the free end of the boss 98. The cap 108 is provided with a radially inwardly directed flange to retain the bearing 106 in operative disposition. The free end of the worm screw 104 terminates in a wrench portion 110. The wrench portion 110 is identical with the wrench portion 72 so that only one handle need be provided.

Figure 8:
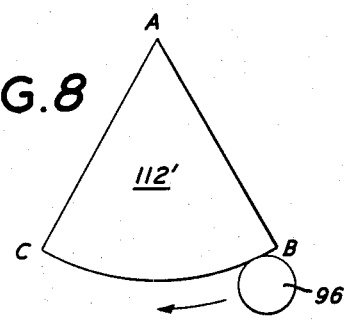
FIGURE 8 is a diagrammatic view illustrating a type of cut which may be made with the present invention.

The milling attachment of the present invention may be utilized to provide any one of a variety of intricate milling cuts. For example, see FIGURE 7 which discloses a workpiece 112 having a pair of holes 114 and 116 extending therethrough. The milling attachment 24 of the present invention may be utilized to interconnect the holes 114 and 116 by a cut 118 which is illustrated in phantom. Other types of cuts which may be made with the present invention are illustrated in FIGURES 8 and 9.

The operation of the apparatus of the present invention is as follows:

A workpiece will be fixedly secured to the support 16 in any convenient manner. Either the workpiece such as workpiece 112 or the milling attachment 24 will be moved so that the milling cutter is juxtaposed to the workpiece. As illustrated in FIGURE 2, the milling cutter 96 is in zero orientation. That is, the longitudinal axis of the milling cutter 96 and collet shaft 92 are in line wtih the longitudinal axis of the drive spindle 32. In order to make radial cuts, the longitudinal axis of the milling cutter 96 may be offset with respect to the longitudinal axis of the drive spindle 32 by rotating the threaded rod 64. The threaded rod 64 is rotated by applying a handle to the wrench portion 72. Arcuate or circumferential cuts are made thereafter by rotating the worm screw 104.

The power transmission in all angular and rotative positions of the milling cutter are as follows: The rotary movement of the motor within the column 12 is transmitted through the pulleys 18 to a drive shaft within the overarm support 22. This rotary motion is transmitted to the drive spindle 32 in a conventional manner. The rotary motion of the drive spindle 32 rotates gear 78 and gear 80 which is meshed with gear 78.

The splined tube 84 is fixedly secured with respect to the gear 80 and rotates therewith. Regardless of the position of the gear 86 along the length of the splined tube 84, the coupling between the splined tube 84 and the gear 86 causes the gear 86 to rotate therewith. The gear 86 is meshingly engaged at all times with the gear 90. The gear 90 is fixedly secured to one end of the collet shaft 92. Hence, a milling cutter will always rotate about a longitudinal axis which is in line with or parallel to the longitudinal axis of the drive spindle 32.

The splined tube 84 extends through the aperture 60 in the cross slide head 58. The distance through which the longitudinal axis of the milling cutter may be moved relative to the longitudinal axis of the drive spindle 32 corresponds with the distance between the flange 54 and the face of the head 58 adjacent the aperture 60. The milling attachment 24 is readily removable from securement to the overarm support 22. When the attachment 24 is not in use, conventional apparatus for holding the milling cutter will be utilized in a conventional manner in depending relation from the overarm support 22.

In order to provide the cut 118 in FIGURE 7, the attachment 24 is set in zero position with cutter 96 in hole 114. The side leg of cut 118 is formed by rotating rod 64. The arcuate portion of cut 118 is formed by rotating screw 104.

The present invention may be used to provide a particular contour for a workpiece as illustrated in FIGURE 8. As illustrated, workpiece 112′ may be milled so as to be pie-shaped. This is accomplished by locating cutter 96 at zero position and at point A. Rod 64 is rotated to mill the edge defined by line AB. Then, screw 104 is rotated to mill line BC. Then, rod 64 is rotated in a reverse direction to mill the edge defined by line CA.

The cuts illustrated in FIGURES 7 and 8 demonstrate milling by using only attachment 24. Cut 118′ in FIGURE 9 demonstrates milling by using attachment 24 and work support 16. Cut 118′ may be made in workpiece 112″ by rotating rod 64 until cutter 96 is spaced from zero position by a distance R. The arcuate portion of cut 118′ defined by AB is obtained by rotating screw 104. The straight line BA is formed by rotating handle 18 to move support 16. In this manner, cutter 96 returns to its starting point A.

Thus, it will be seen that the attachment of the present invention is simpler than those proposed heretofore and is adapted to utilize the source of power of a conventional milling machine thereby obviating the necessity for providing a milling attachment with its own source of power. The provision of a separate source of power for operating the attachment unnecessarily complicates the attachment, is a material cost which is eliminated by the present invention, and restricts the number of machines which can be utilized with such an attachment. That is many machines are designed in a manner which does not facilitate the use of a milling attachment which require the separate power supply.

The present invention may be embodied in other specific forms without departing from the spirit or essential attributes thereof and, accordingly, reference should be made to the appended claims, rather than to the foregoing specification as indicating the scope of the invention.

We claim:

1. A milling attachment adapted to be removably secured to a support comprising a hollow casing, a drive spindle supported by said casing and adapted to be coupled to a rotary drive on a support, a head for supporting a milling cutter, means coupling said head to said casing so that said cutter has an axis of rotation which is in line with the axis of rotation of said drive spindle, said means supporting said head so that said drive spindle may rotatably drive said cutter in positions wherein the axis of rotation of said cutter moves radially and circumferentially with respect to the axis of rotation of said drive spindle including a splined member having a longitudinal axis substantially perpendicular to the axis of rotation of said spindle, first meshed gears for transmitting the rotary motion of said spindle to said splined member, and second meshed gears for transmitting the rotary motion of said splined member to said cutter.

2. Apparatus in accordance with claim 1 including a ring gear rotatably supported by said casing, means supported by said casing for selectively rotating said ring gear, and means coupling said ring gear to one of said first meshed gears whereby said one of said meshed gears moves with said ring gear.

3. Apparatus in accordance with claim 1 wherein said splined member is hollow, and a threaded member partially disposed within said splined member for assisting in movement of the axis of rotation of said cutter in a direction substantially perpendicular to the longitudinal axis of said spindle, and one end of said threaded member being coupled to said head.

4. In a milling apparatus comprising a support having a rotary drive, a milling attachment removably secured to said support, said attachment including a drive spindle supported thereby and coupled to said rotary drive, a head for supporting a milling cutter so that said cutter has an axis of rotation which is in line with the axis of rotation of said drive spindle, and means supporting said head with respect to said drive spindle so that said drive spindle may rotatively drive said cutter in positions wherein the axis of rotation of said cutter moves radially and circumferentially with respect to the axis of rotation of said drive spindle, said means including a splined member having a longitudinal axis substantially perpendicular to the axis of rotation of said spindle, first meshed gears for transmitting the rotary motion of said spindle to said splined member, and second meshed gears for transmitting the rotary motion of said splined member to said cutter.

5. In a milling apparatus in accordance with claim 4 wherein said first meshed gears are of the same size, said second meshed gears being of the same size, the size of the first meshed gears being different from the size of the second meshed gears, whereby the longitudinal axis of said cutter may coincide with the longitudinal axis of said spindle.

6. In a milling apparatus in accordance with claim 4 wherein said splined member is hollow, and a threaded member disposed partially within said splined member for assisting in movement of the axis of rotation of said cutter in a direction substantially perpendicular to the longitudinal axis of said drive spindle.

7. In a milling apparatus in accordance with claim 4 wherein said means includes an arm extending in a direction substantially perpendicular to the longitudinal axis of said spindle, said arm having a portion rotatably supporting one end of said splined member.

References Cited in the file of this patent

UNITED STATES PATENTS

| | | |
|---|---|---|
| 450,398 | Corliss | Apr. 14, 1891 |
| 2,718,820 | Faselt | Sept. 27, 1955 |